United States Patent [19]

Steiner

[11] 4,120,029
[45] Oct. 10, 1978

[54] METHOD AND APPARATUS FOR RECOVERING A SIGNAL TRANSFERRED OVER A COMMON BUS IN A DATA PROCESSING SYSTEM

[75] Inventor: Gordon Lewis Steiner, Milford, Mass.

[73] Assignee: Honeywell Information Systems, Inc., Waltham, Mass.

[21] Appl. No.: 754,287

[22] Filed: Dec. 27, 1976

[51] Int. Cl.² ............................................. G06F 3/04
[52] U.S. Cl. ................................................ 364/200
[58] Field of Search ... 364/900 MS File, 200 MS File; 333/6, 8

[56] References Cited

U.S. PATENT DOCUMENTS

| | | | |
|---|---|---|---|
| 3,237,164 | 2/1966 | Evans | 364/200 |
| 3,740,722 | 6/1973 | Greenberg et al. | 364/200 |
| 3,983,540 | 9/1976 | Keller et al. | 364/200 |
| 3,993,981 | 11/1976 | Cassarino, Jr. et al. | 364/200 |

Primary Examiner—Melvin B. Chapnick
Attorney, Agent, or Firm—John S. Solakian; Ronald T. Reiling; Nicholas Prasinos

[57] ABSTRACT

The recovery of a signal on a common bus in a data processing system in which contiguous bus cycles may be generated for the transfer of information between any units coupled to such bus by a method and apparatus which enables such recovery to take place during a first or just completed bus cycle. The following bus cycle takes advantage of an arrangement by which the signal may not be stable until a predetermined point in time in each bus cycle. Data, address and control signals may be recovered by this method and apparatus which uses termination resistors on the bus which are greater in value than the characteristic impedance thereof.

12 Claims, 8 Drawing Figures

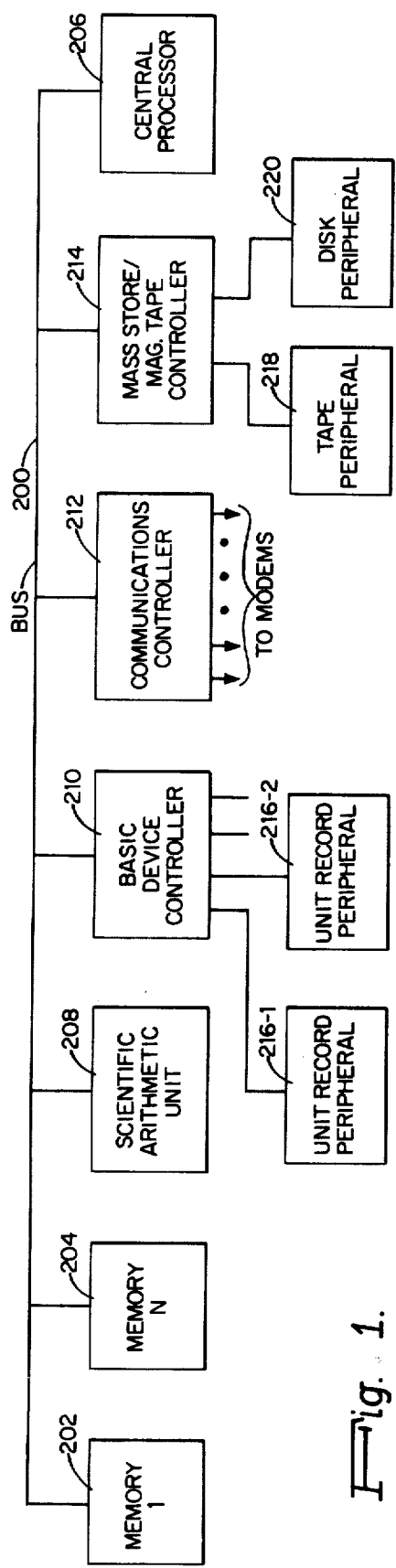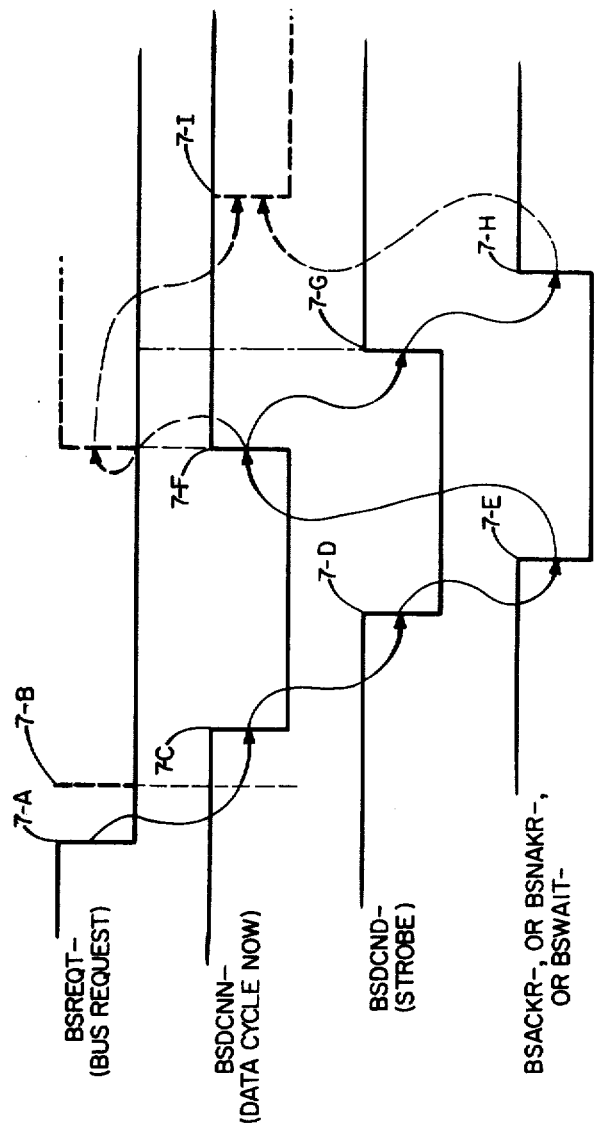

METHOD AND APPARATUS FOR RECOVERING A SIGNAL TRANSFERRED OVER A COMMON BUS IN A DATA PROCESSING SYSTEM

BACKGROUND OF THE INVENTION

The present invention relates generally to data processing systems and more particularly to the coupling of units in such a data processing system for communication of information over a common electrical bus.

In data processing systems which utilize a common electrical bus for coupling the various units which desire to transfer information therebetween, for example, a central processor, memory, and various types of controllers, the speed in which such tranfers of information are handled is sometimes critical. Thus, it is very important to be sure that various signals are in a given binary state or at a predetermined level prior to the use thereof in the system. This is true for not only control signals but also for address and data signals. Typically, in order to provide waveforms which generate the required signal without reflections on the various electrical lines of the bus, each line is terminated with an impedance which matches the characteristic impedance of the particular line of the bus. In such case, there are no reflections of such signals on the bus in order to achieve the proper voltage to for example turn on a driver or transistor. This is so because such waveform achieves a threshold voltage in its initial rise and the signal thus does not take the additional period of time to recover as might be required where such signal makes more than one pass on the bus to achieve such threshold voltage. However, in so matching the characteristic impedance of a particular line with a terminating resistor, the power in the system is increased because of the well-known relationship of power to voltage and resistance. On the other hand, it is sometimes possible to utilize a terminating resistor whose value is greater than the characteristic impedance thereby causing reflections which, however, decrease the response time of the system. In some situations this decrease in response time is not tolerable, and, accordingly, a balance must be made between the power consumed and the speed of the system.

It is accordingly an object of the invention to provide a data processing system having a common bus coupling a plurality of units for transfer of information therebetween in which the signals on such bus are recovered in a manner consistent with decreasing the power required in the system while maintaining the response time of the system.

SUMMARY OF THE INVENTION

The signal recovery technique of the present invention is provided in a data processing system having a common bus for coupling a plurality of units for the transfer of information therebetween, each transfer taking place during a bus cycle granted to the highest priority unit requesting a bus cycle, the unit transferring such information referred to as a master unit for a particular cycle, and the unit receiving such information referred to as a slave unit for a particular cycle, such signal recovery technique including apparatus or a method for recovering a signal to a predetermined level, which method comprises the following steps. An initial step of indicating, by means of a first signal to each of the units that a previous master unit has transferred information, including the signal to be recovered, over the bus during the previous bus cycle is provided. In response to such step of indicating is provided the step of enabling the signal to be recovered to such predetermined level in a period of time substantially determined by the length of the bus, the characteristic impedance of the line of said bus on which such signal to be recovered is transferred and the value of such termination impedance coupled with such signal line, the value of a termination impedance being greater than the characteristic impedance. Further, in response to such step of indicating, is provided the following three steps which are completed concurrently with the step of enabling, provided however that the recovering of the signal in response to the step of enabling is completed prior to the completion of the following steps: deactivating a response indication provided by a previous slave unit to the previous master unit in response to the transfer of information from such previous master unit, coupling in response to the step of deactivating, a new master unit to transfer information over the bus; and transferring, in response to the step of coupling, a strobe signal to a new slave unit for use in receiving the information at the new slave unit.

BRIEF DESCRIPTION OF THE DRAWINGS

For a fuller understanding of the nature and objects of the invention, reference should be made to the following detailed description taken in conjunction with the accompanying drawings wherein:

FIG. 1 is a general block diagram of the system of the present invention;

FIG. 2 is a timing diagram illustrating the operation of the common bus of the present invention;

DETAILED DESCRIPTION OF THE PREFERRED EMBODIMENT

Figure 3:
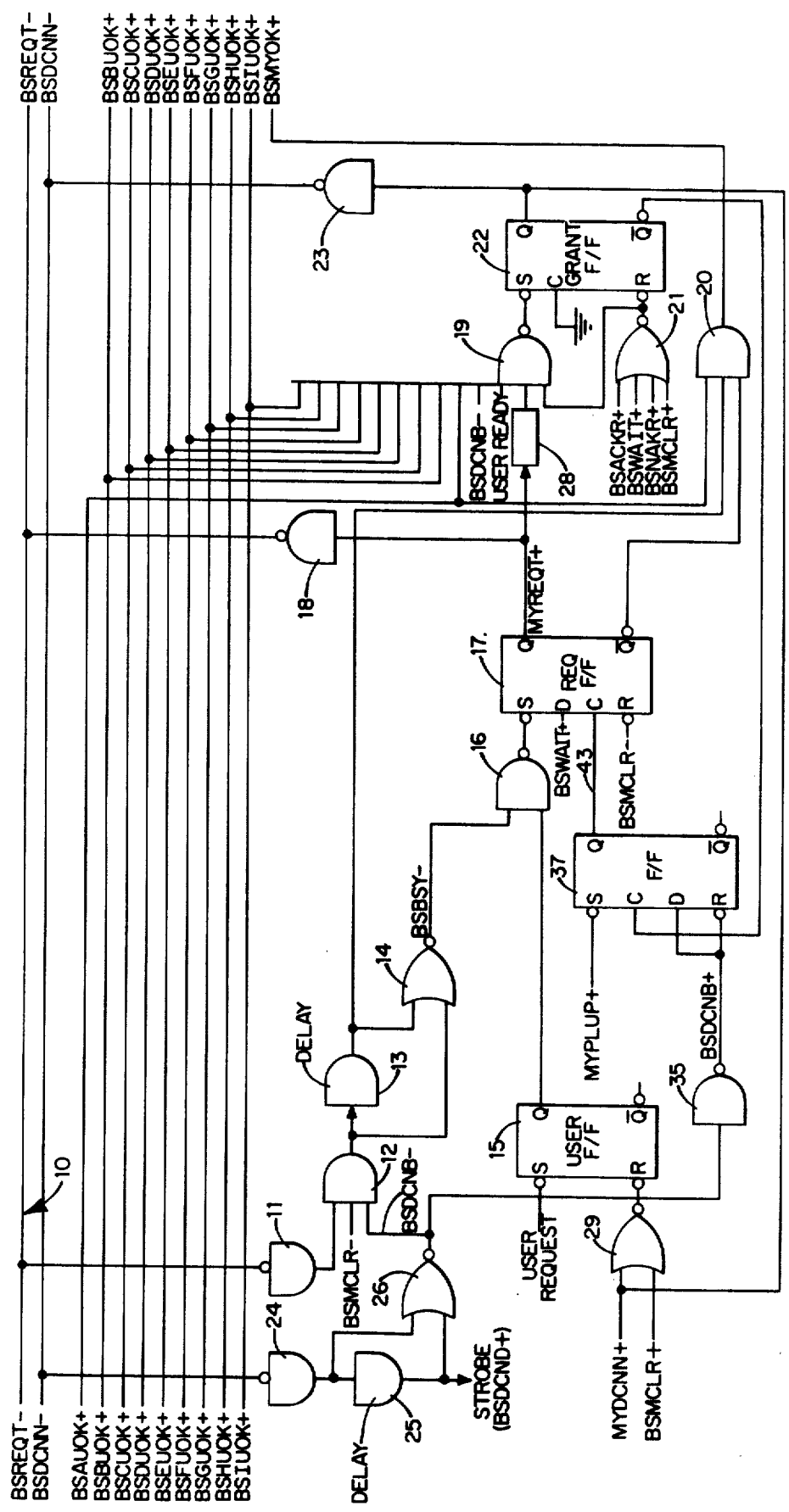
FIG. 3 is a detailed logic diagram illustrating the priority logic associated with the bus of the present invention.

The data processing bus of the present invention provides a communication path between two units in the system. The bus is asynchronous in design enabling units of various speeds connected to the bus to operate efficiently in the same system. The design of the bus of the present invention permits communications including memory transfers, interrupts, data, status, and command transfers. The overall configuration of a typical system is shown in FIG. 1. For a further description of the bus and interface logic of such system, U.S. Pat. No. 3,993,981, issued on Nov. 23, 1976, which is incorporated herein by reference, should be consulted.

The bus permits any two units to communicate with each other at a given time via a common (shared) signal path. Any unit wishing to communicate, requests a bus cycle. When that bus cycle is granted, that unit becomes the master and may address any other unit in the system as the slave. Most transfers are in the direction of master to slave. Some types of bus interchange require a response cycle (read memory for example). In cases where a response cycle is required, the requestor assumes the role of the master, indicates that a response is required, and identifies itself to the slave. When the required information becomes available, (depending on slave response time), the slave now assumes the role of the master, and initiates a transfer to the requesting unit. This completes the interchange which has taken two bus cycles in this case. Intervening time on the bus between these two cycles may be used for other system traffic not involving these two units.

A master may address any other unit on the bus as a slave. It does this by placing the slave address on the address leads. There may be 24 address leads for example which can have either of two interpretations depending on the state of an accompanying control lead. It should be noted that as used in this specification, the terms binary ZERO and binary ONE are used respectively to refer to the low and high states of electrical signals. In essence, when the memory is being addressed, the bus enables up to $2^{24}$ bytes to be directly addressed in memory. When units are passing control information, data or interrupts, they address each other by channel number. The channel number allows up to $2^{10}$ channels to be addressed by the bus. Along with the channel number, a six bit function code is passed which specifies which of up to $2^6$ possible functions this transfer implies.

When a master requires a response cycle from the slave, it indicates this to the slave by one state (read command) of a control lead named BSWRITE- (the other state thereof not requiring a responese, i.e. a write command). In addition, the master may provide its own identity to the slave by means of a channel number. The data leads, as opposed to the bus address leads, are coded to indicate the master's identity when a response is required from the slave. The response cycle is directed to the requestor by a non-memory reference transfer. The control lead, indicated as a second-half bus cycle (BSSHBC−), is enabled to designate that this is the awaited cycle (as compared to an unsolicited transfer from another unit).

The distributed tie-breaking network provides the function of granting bus cycles and resolving simultaneous requests for use of the bus. Priority is granted on the basis of physical position on the bus, the highest priority being given to the first unit on the bus. The logic to accomplish the tie-breaking function is shown in FIG. 3 and is distributed identically among all units connected to the bus. In a typical system, the memory is granted the highest priority and the central processor is granted the lowest priority with the other units being positioned on the basis of their performance requirements.

Thus, referring to FIG. 1, a typical system of the present invention includes a multiline bus 200 coupled with memory 1-202 through memory N-204, such memories having the highest priority and with the central processor 206 having the lowest priority. Also connected on the bus may be included for example a scientific arithmetic unit 208 and various controllers 210, 212 and 214. Controller 210 may be coupled to control for example four unit record peripheral devices 216. Controller 212 may be used to provide communications control via modem devices whereas controller 214 may be utilized to control mass storage devices such as a tape peripheral device 218 or a disk peripheral device 220. As previously discussed, any one of the devices coupled with the bus 200 may address a memory or any other unit connected to the bus. Thus tape peripheral 218 may, via controller 214, address memory 202. As shall be hereinafter discussed, each of such units directly connected to the bus includes a tie-breaking logic as illustrated and discussed with respect to FIG. 3, and further each one of such units includes address logic as discussed in the aforementioned U.S. patent. Units not directly connected to the bus, such as units 216, 218 and 220 also have their own tie-breaking logic.

A channel number will exist for every end point in a particular system with the exception of the memory type processing elements which are identified by the memory address. A channel number is assigned for each such device. Full duplex devices as well as half-duplex devices utilize two channel numbers. Output only or input only devices use only one channel number each. Channel numbers are easily variable and accordingly one or more hexadecimal rotary switches (thumb wheel switch) may be utilized for each such unit connected with the bus to indicate or set the unit's address. Thus when a system is configured, the channel number may be designated for the particular unit connected to the bus as may be appropriate for that particular system. Units with multiple input/output (I/O) ports generally will require a block of consecutive channel numbers. By way of example, a four port unit may use rotary switches to assign the upper 7 bits of a channel number and may use the lower order 3 bits thereof to define the port number to distinguish input ports from output ports. The channel number of the slave unit will appear on the address bus for all non-memory transfers. Each unit compares that number with its own internally stored number (internally stored by means of the rotary switches). The unit which achieves a compare is, by definition, the slave, and must respond to that cycle. Generally, no two points in a single system will be assigned to the same channel number.

There are various output and input functions. One of the output functions is a command whereby a data quantity, for example 16 bits is loaded into the channel from the bus. The meanings of the individual data bits are component specific, but the data quantity is taken to mean the data to be stored, sent, transmitted etc. depending upon the specific component functionality. Another such output function is a command whereby for example a 24 bit quantity is loaded into a channel address register (not shown). The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as print commands, output configuration which is a command to indicate functions such as terminal speed, card reader mode, etc., and output interrupt control which is a command which loads for example a 16-bit word into the channel. The first ten bits indicate the central processor channel number and the remaining six bits indicate the interrupt level. Upon interrupt, the central processor channel number is returned on the address bus while the interrupt level is returned on the data bus.

The input functions include functions similar to the output functions except in this case the input data is transferred from the device to the bus. Thus, input functions include the input data, input address and input range commands as well as the task configuration and interrupt commands. In addition, there is included the device identification command whereby the channel places its device identification number on the bus. Also included are two input commands whereby a status word 1 or a status word 2 is placed on the bus from the channel as presently discussed.

The indication from status word 1 may include for example whether or not the specific device is operational, whether it is ready to accept information from the bus, whether there is an error status or whether attention is required. Status word 2 may include for example an indication of parity, whether there is a non-correctable memory or a corrected memory error, whether there is a legal command or for example whether there is a non-existent device or resource.

As previously discussed, a unique device identification number is assigned to every different type of device which is connected to the bus. This number is presented on the bus in response to the input function command entitled input device identification. For convenience, the number is separated into 13 bits identifying the device (bits 0 through 12) and three bits identifying certain functionality of the device (bits 13 through 15) as may be required.

A unit wishing to interrupt the central processor requests a bus cycle. When the bus cycle is granted, the unit places its interrupt vector on the bus, the interrupt vector including the channel number of the central processor and the interrupt lever number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt. Acceptance is indicated by a bus ACK signal (BSACKR—). If the central processor cannot accept the interrupt, a NAK signal is returned (BSNAKR—). Devices receiving a NAK (sometimes referred to as NACK) signal will retry when a signal indicating resume normal interrupting is received from the CP (BSRINT—). The central processor issues this signal when it has completed a level change and therefore may be capable of accepting interrupts once again. The channel number of the master is supplied in the vector for use since more than one channel may be at the same interrupt level. Interrupt level 0 is of special significance since it is defined to mean that the unit shall not interrupt.

FIG. 2 illustrates the bus timing diagram and will be discussed more specifically hereinafter. Generally, however the timing is as follows. The timing applies to all transfers from a master unit to a slave unit connected to the bus. The speed at which the transfer can occur is dependent upon the configuration of the system. That is, the more units connected to the bus and the longer the bus, then, due to propagation delays, the longer it takes to communicate on the bus. On the other hand, the lesser amount of units on the bus decreases the response time. Accordingly, the bus timing is truly asynchronous in nature. A master which wishes a bus cycle makes a bus request. The signal BSREQT— is common to all units on the bus and if a binary ZERO, indicates that at least one unit is requesting a bus cycle. When the bus cycle is granted, the signal BSDCNN— becomes a binary ZERO indicating that a tie-breaking function as more specifically discussed with respect to FIG. 3, is complete and that one specific master now has control of the bus. At the time the signal BSDCNN— becomes a binary ZERO, the master applies the information to be transferred to the bus. Each unit on the bus develops an internal strobe from the signal BSDCNN—. The strobe is delayed for example approximately 60 nanoseconds from the reception of the binary ZERO state of the BSDCNN— signal. When the delay is complete in the slave, the bus propagation time variations will have been accounted for and each slave unit would have been able to recognize its address (memory address or channel number). The addressed slave can now make one of three responses, either an ACK, a NACK or a WAIT signal, or more specifically a BSACKR—, a BSNAKR, or a BSWAIT— signal. The response is sent out on the bus and serves as a signal to the master that the slave has recognized the requested action. The control lines then return to the binary ONE state in the sequence as shown in FIG. 2. Thus the bus handshake is fully asynchronous and each transition will only occur when the preceding transition has been received. Individual units may therefore take different lengths of time between the strobe and the ACK, etc., transition depending on their internal functionability. A bus timeout function exists to prevent hang ups which could occur.

The tie-breaking function, more specifically described with respect to FIG. 3, is that of resolving simultaneous requests from different units for service and granting bus cycles on a basis of a positional priority system. As indicated hereinbefore, the memory has the highest priority and the central processor has the lowest priority and they reside physically at opposite ends of the bus 200. Other units occupy intermediate positions and have priority which increases relative to their proximity to the memory end of the bus. The priority logic of FIG. 3 is included in each one of the units directly connected to the bus in order to accomplish the tie-breaking function, it being noted at this point that element 28 is only included in the highest priority unit as discussed hereinafter.

Each such units's priority network includes a grant flip-flop 22. At any point in time, only one specific grant flip-flop may be set and that unit is by definition the master for that specific bus cycle. Any unit may make a user request at any time thus setting its user flip-flop 15. At any time therefore, many user flip-flops may be set, each representing a future bus cycle. In addition, each unit on the bus contains a request flip-flop 17. When all units are considered together, the request flip-flops may be considered as a request register. It is the outputs of this request register that supply the tie-breaking network which functions to set only one grant flip-flop no matter how many requests are pending. More specifically, if there were no pending requests, then no request flip-flops would be set. The first user flip-flop to set would cause its request flip-flop to set. This in turn would inhibit, after a short delay as hereinafter described, other devices from setting their request flip-flops. Thus what occurs is that a snapshot of all user requests is taken for the given period in time (the delay's period). The result is that a number of request flip-flops may be set during this delay period depending upon their arrival. In order to allow the request flip-flops to have their outputs become stable, each unit includes such delay in order to insure that such stabilization has occurred. A particular grant flip-flop is set if the unit associated therewith has its request flip-flop set and the delay time has elapsed and no higher priority unit wants the bus cycle. A strobe signal is then generated after another delay period and finally the grant flip-flop is cleared (reset) when the master receives an ACK, NACK or WAIT signal from the slave unit.

As indicated hereinbefore, there are three possible slave responses, the ACK, the WAIT or the NACK signal. In addition, there is a fourth state in which there is no response at all. In the case where no unit on the bus recognizes the transfer as addressed to it, no response will be forthcoming. A time out function will then take place and a NACK signal will be received thereby clearing the bus. An ACK signal will be generated if the slave is capable of accepting the bus transfer from the master and wishes to do so. The WAIT response is generated by the slave if the slave is temporarily busy and cannot accept a transfer at this time. Upon receipt of the WAIT signal, the master will retry the cycle at the next bus cycle granted to it and continue to do so until successful. Some of the causes of a WAIT response from a slave, when the central processor is the master, are for example, when the memory is a slave and the memory is responding to a request from another unit or when a controller is a slave, for example, if the controller is waiting for a response from memory or if the controller has not yet processed the previous input/output command. When a controller is the master and the central processor is the slave, the central processor may respond with an ACK or a NACK signal to the controller, but not a WAIT signal. In addition, the memory when it is the master cannot be caused to wait whether the slave unit is a central processor or a controller. The NACK signal indicated by the slave means that it cannot accept a transfer at this time. Upon receipt of a NACK signal, a master unit will not immediately retry but will take specific action depending upon the type of master.

As generally indicated hereinbefore, there are basic timing signals on the bus which accomplish the handshaking function thereof. These five signals, as discussed hereinbefore, are bus request signal (BSREQT—) which when a binary ZERO indicates that one or more units on the bus have requested the busy cycle; the data cycle now signal (BSDCNN—) which when a binary ZERO indicates a specific master is making a bus transfer and has placed information on the bus for use by some specific slave; the ACK signal (BSACKR—) which is a signal generated by the slave to the master that the slave is accepting this transfer by making this signal a binary ZERO; the NAK signal (BSNAKR—) which is a signal generated by the slave to the master indicating to the master when it is a binary ZERO that it is refusing this transfer; and the WAIT signal (BSWAIT—) which is a signal generated by the slave to the master indicating when it is a binary ZERO that the slave is refusing the transfer.

In addition, there may be as much as 50 information signals which are transferred as the information content of each bus cycle. These signals are valid for use by the slave on the leading edge of the strobe signal.

With more particular reference to the timing diagram of FIG. 2, in every bus cycle there are three identifiable parts, more particularly, the period (7-A to 7-C) during which the highest priority requesting device wins the bus, the period (7-C to 7-E) during which the master unit calls a slave unit and in so calling provides data and address information, and the period (7-E to 7-G) during which the slave responds. When the bus is idle the bus request signal (BSREQT—) is a binary ONE. The bus request signal's negative going edge at time 7-A starts a priority net cycle. There is an asynchronous delay allowed within the system for the priority net to settle (at time 7-B) and a master user of the bus to be selected. The next signal on the bus is the BSDCNN— or data cycle now signal. The BSDCNN— signal's transition to a binary ZERO at time 7-C means that use of the bus has been granted to a master unit. Thereafter, the second phase of bus operation means the master has been selected and is now free to transfer information on the data, address and control leads of the bus 200 to a slave unit that the master so designates.

The slave unit prepares to initiate the third phase of bus operation beginning at the negative going edge of the strobe or BSDCND— signal. The strobe signal is delayed, for example, 60 nanoseconds from the negative going edge of BSDCNN— signal by delay line 25 of FIG. 3. Upon the occurrence of the negative going edge of the BSDCND— signal at time 7-D, the slave unit can now test to see if this is its address and if it is being called to start the decision making process of what response it is to generate. Typically, this will cause an acknowledge signal (BSACKR—) to be generated by the slave unit or in the non-typical cases a BSNAKR— or BSWAIT— signal or even no response at all (for the case of a nonexistent slave) may be generated as herein described. The negative going edge of the acknowledge signal at time 7-E when received by the master unit, causes the master's BSDCNN— signal to go to a binary ONE at time 7-F. The strobe signal returns to the binary ONE state at time 7-G, which is a delay provided by delay line 25 from time 7-F. The manner in which the ACK, NAK and WAIT signals are generated is explained in the aforementioned U.S. patent.

Thus, in the third phase of bus operation, the data and address on the bus are stored by the slave unit and the bus cycle will begin to turn off. The bus cycle is essentially complete when BSDCNN— goes to a binary ONE at which time another priority net resolution is enabled. The bus cycle is complete when the ACK, etc. signal goes to a binary ONE state at time 7-H. A bus request signal may, at time 7-F, be generated and if not received, this means that the bus will return to the idle state, and accordingly the BSREQT— signal would go to the binary ONE state. If the bus request signal is present at that time, i.e., a binary ZERO as shown, it will start the asynchronous priority net selection process following which another negative going edge of the BSDCNN— signal will be enabled as shown by the dotted lines at time 7-I. It should be noted that this priority net resolution need not wait or be triggered by the positive going edge of the acknowledge signal at time 7-H, but may in fact be triggered at a time 7-F just following the transition of the bus to an idle state if thereafter a unit desires a bus cycle. This process repeats in an asynchronous manner.

Now referring to the priority net logic of FIG. 3, the priority net cycle is initially in an idle state and the bus request signal (BSREQT—) on line 10 is a binary ONE. When this bus request signal is a binary ONE, the output of receiver (inverting amplifier) 11 will be a binary ZERO. The output of receiver 11 is coupled to one input of gate 12. The other inputs to gate 12 are the bus which is normally a binary ONE and the output of gate 26 which is normally a binary ONE also. The output of gate 12, during the bus idle state is thus a binary ZERO, and thus the output of the delay line 13 will be a binary ZERO. The input and the output of the delay line 13 being a binary ZERO allows the output of NOR gate 14 (BSBSY—) to be a binary ONE. When one of the units connected to the bus desires a bus cycle, it asynchronously sets its user flip-flop 15 so that its Q output is a binary ONE.

Thus, with the bus in the idle state, the first event that occurs as the bus goes to the busy state is that the user sets its user request flip-flop 15. When both inputs to gate 16 are a binary ONE state, the output thereof is a binary ZERO. This sets the request flip-flop 17 so that its Q output (MYREQT+) is a binary ONE. Thus, in an asynchronous manner, the Q output of request flip-flop 17 will be a binary ONE. This operation can be coincidentally occurring in the similar logic of the other units connected with the bus.

The binary ONE state of the MYREQT+ signal will be placed on line 10 of the bus via driver 18 as a binary ZERO. Thus referring to the timing diagram of FIG. 2, the BSREQT— signal goes negative or to a binary ZERO state. Any request to the system from any one of the request flip-flops 17 of the various units connected to the bus will thus hold line 10 in the binary ZERO state. The delay line 13 includes sufficient delay to compensate for the propagation delay encountered by elements 14, 16 and 17. Thus, even though a device sets its request flip-flop 17, this does not mean that a higher priority device, which also requests a bus cycle, will not take the next bus cycle. For example, if a lower priority device sets its request flip-flop 17, the binary ZERO signal on line 10 is fed back to all devices, including the higher priority device, which in turn generates a binary ONE state at the output of its gate 12 so as to generate a binary ZERO state at the output of gate 14, thereby disabling the setting of the request flip-flop 17 of such other higher priority device, if in fact the user flip-flop 15 of such higher priority device had not already been set. Once the delay time of, for example 20 nanoseconds has expired and the output of delay 13 of such higher priority device is now a binary ONE state, then the output of gate 14 will be a binary ZERO state so that independent of whether or not the user flip-flop 15 of such higher priority device has been set, the output of gate 16 will be a binary ONE thereby disabling the setting of request flip-flop 17. Thus during such time frame, all devices have their request flip-flop 17 set if in fact they are requesting service as indicated by the setting of their user flip-flop 15. After the delay time provided by element 13 of the device first requesting a bus cycle, a device not having had its request flip-flop 17 set cannot do so until after the priority cycle is completed. Thus the higher priority device will win the bus even if its user flip-flop is set a few nanoseconds after the lower priority device sets its flip-flop.

Thus, all of the request flip-flops 17 for devices seeking a bus cycle will have been set during such interval as indicated by the delay line arrangement of delay line 13. Notwithstanding that many of such devices coupled with the bus may have their request flip-flops set during such time interval, only one such device may have its grant flip-flop 22 set. The device that has its grant flip-flop 22 set will be the highest priority device seeking the bus cycle. When such highest priority device seeking a bus cycle has completed its operation during such bus cycle, the other devices which have their request flip-flops set, will again seek the next such bus cycle and so on. Thus the Q output of request flip-flop 17 in addition to being coupled to driver 18 is also coupled to one input of NAND gate 19 via element 28. Element 28 is no more than a direct connection for each unit's priority logic, except that unit (usually the memory 202) which is coupled to the highest priority end of the bus 200, in which sole case element 28 is a delay element as explained hereinafter. The Q output of flip-flop 17 is coupled to one input of AND gate 20. The other inputs to gate 19 are received from the higher priority devices and more particularly, for example, nine preceding higher priority devices. These signals received from the higher priority devices are shown to be received from the left-hand side of FIG. 3 as signals BSAUOK+ through BSIUOK+. If any one of such nine signals is a binary ZERO, this will mean that a higher priority device has requested a bus cycle and accordingly this will inhibit the current device from having its grant flip-flop 22 set and thereby disable it from having the next bus cycle.

The other inputs received by gate 19 are from the NOR gate 26, i.e., the BSDCNB— signal and the output of NOR gate 21. In addition, a User Ready signal may be received from the particular unit's other logic by which, the particular unit, even though granted a bus cycle, may delay it by changing the User Ready signal to the binary ZERO state. That is, the unit even though not ready for a bus cycle may request it and set the User Ready signal to a binary ZERO, in anticipation that it will be ready by the time bus cycle is granted. The output of NOR gate 26 is normally a binary ONE and if all other inputs to gate 19 are a binary ONE, then grant flip-flop 22 will be set. The other input from gate 21 is a binary ONE when the bus is in an idle state. The inputs to NOR gate 21 are the BSACKR+ signal, the BSWAIT+ signal, the BSNAKR+ signal and the BSMCLR+ signal. If any one of these signals is a binary ONE, then the bus will accordingly be in a busy state and the flip-flop 22 cannot be set.

If grant flip-flop 22 has been set, the Q output signal is a binary ONE and will be inverted to a binary ZERO signal by inverter 23 and will then be placed on the bus on signal line BSDCNN—. This is shown in the timing diagram of FIG. 2 wherein the BSDCNN— signal goes from the binary ONE to the binary ZERO state. Thus, the priority cycle of the bus cycle is completed.

In addition, if the present device does require service and is the highest priority device, the output from delay 13 and the BSAUOK+ priority line will be a binary ONE, however, the Q output of flip-flop 17 will be a binary ZERO thereby placing a binary ZERO via AND gate 20 on the BSMYOK+ line thereby indicating to the next lower priority device and succeeding lower priority devices that there is a requesting higher priority device which will be using the next bus cycle, thereby inhibiting all lower priority devices from so using the next bus cycle. It should be noted that the nine priority lines received from the higher priority devices are transferred in a skewed manner by one position as signals BSBUOK+ through BSMYOK+. Thus, singal BSAUOK+ received by the present device corresponds to signal BSBOUK+ at the next lower priority device.

Having completed a priority cycle and having now caused a binary ZERO state to be placed on the BSDCNN— line, the signal is received by all such logic as shown in FIG. 3 by receiver 24. This causes the binary ONE state to be generated at the output of receiver 24 and a binary ZERO to be provided at the output of NOR gate 26 thereby disabling AND gate 12 from generating a binary ONE state. In addition, the binary ONE state at the output of receiver 24 is received by delay line 25 which is by way of example 60 nanoseconds in duration. The output of delay line 25 is also received at the other input of NOR gate 26 so as to continue to inhibit gate 12 when the strobe is generated. Thus at the end of the delay line period established by delay line 25, the strobe (BSDCND+) signal is generated, the inversion of which, i.e., the BSDCND− signal is shown in the timing diagram of FIG. 2. The use of the strobe signal is hereinafter described. Thus the 60 nanosecond period produced by delay line 25 enables the winning device, i.e., the highest priority requesting device, to utilize the next bus cycle without interference. The strobe generated at the output of delay line 25 is used by a potential slave as a synchronizing signal.

If the strobe signal has been transmitted, then the one of the units which is designated as the slave, will respond with either one of the signals, ACK, WAIT or NACK received at one of the inputs of gate 21. If in the typical case, the ACK is received, for example, or if any of such response signals are received, this will reset the grant flip-flop 22. This response is shown in the timing diagram of FIG. 2 wherein the BSACKR− signal is shown to be received from the slave thereby causing the BSDCNN− signal to change to the binary ONE state by the resetting of grant flip-flop 22. Flip-flop 15 will be reset via NOR gate 29 if the grant flip-flop 22 has been set, or if the bus clear signal, as is the case for the other two flip-flops 17 and 22 is received on the bus.

When the grant flip-flop 22 is set, its $\overline{Q}$ output goes to the binary ZERO state following which, when the grant flip-flop 22 is reset, the $\overline{Q}$ output goes from the binary ZERO to the binary ONE state thereby effectively resetting request flip-flop 17 as shall be presently explained. As may be noted from the aforementioned U.S. patent, the request flip-flop 17 was shown to be reset by either the ACK, NACK or master clear signal. With respect to the ACK or NACK signals, this assumes that the device whose request flip-flop 17 is to be reset, retained in local storage such as a flip-flop, the fact that it expected either a ACK, NACK or WAIT signal. Further, such units required logic which could discern that in fact such ACK or NACK signal was a response from a slave unit to this particular unit. Otherwise a NACK or ACK signal would couple to reset all the flip-flops 17 thereby requiring that each of such request flip-flops 17 be set again. Accordingly, logic is minimized in the system by resetting the particular unit. This is accomplished by effectively coupling the $\overline{Q}$ output of the grant flip-flop 22 to the clock input of request flip-flop 17. It should be noted that the ACK or NACK as well as the WAIT signal are utilized to reset the grant flip-flop 22, but in so doing, does not require additional logic since, in fact, only one grant flip-flop 22 could have been set. Thus, the resetting of all grant flip-flops makes no difference in the operation of the system.

In order to enable the clock input of flip-flop 17, the signal received at such clock input must be a transition from the binary ZERO to the binary ONE state. When the clock input is so enabled, the signal at the D input thereof, i.e. the BSWAIT+ signal will have its state transferred to the Q output of flip-flop 17. Accordingly, in order to effectively reset flip-flop 17, the WAIT signal must be a binary ZERO so as to cause the Q output of flip-flop 17 to be a binary ZERO when the clock input thereof is enabled. Since the WAIT signal is normally a binary ZERO, premature enabling of the clock input request flip-flop 17 may erroneously reset such flip-flop. This is so because the response from a slave unit cannot be anticipated, it being noted that the slave unit may in the alternative provide either a ACK, NACK or WAIT signal, in which case of the WAIT signal, it is not desired to reset the request flip-flop 17. Thus the clock input should be enabled only when a response has been received from the slave unit. Otherwise the WAIT signal may be in the binary ZERO state thereby prematurely resetting the request flip-flop 17.

It can be seen that under normal conditions therefore that a direct connection from the $\overline{Q}$ output to the clock input of flip-flop 17 would maintain a binary ONE state at such clock input, and that accordingly when grant flip-flop 22 is set and then reset, the change in state would enable such clock input of flip-flop 17. This condition, i.e. normally a binary ONE state at the clock input of flip-flop 17, has been found to delay the propagation of the setting action of such flip-flop wherein the Q output thereof actually realizes the set condition, i.e. the binary ONE state. More particularly, for example using a flip-flop whose part number is 74 74 which is manufactured by a number of companies including, for example, Texas Instruments Inc. and Signetic Corporation, with the clock input at a binary ONE state, it takes twice as long to realize the effect of the setting action than it does if the clock input is in the binary ZERO state. Accordingly, as can be seen by the connection of the clock input of flip-flop 22 to ground, this insures faster setting action for such grant flip-flop 22 and it is accordingly desirable to enable such increase in logic speed for the request flip-flop 17. Because of this, and the fact that the request flip-flop 17 should not be effectively reset until there is a response from the slave, elements 35 and 37 are coupled in the logic as shall be presently explained.

Before such explanation however, it should be noted that the provision of an inverter directly between the $\overline{Q}$ output of grant flip-flop 22 and the clock input of request flip-flop 17 would not be satisfactory even though this would provide a normally binary ZERO state at the clock input of request flip-flop 17. This condition would not be satisfactory because the binary ONE to binary ZERO transition from the $\overline{Q}$ output of flip-flop 22 when such flip-flop is set would become a binary ZERO to binary ONE transition which would enable the clock input of flip-flop 17 prematurely, that is, prior to knowing what the response from the slave unit will be.

Accordingly, inverter 35 is provided along with flip-flop 37. Like request flip-flop 17 the clock input of flip-flop 37 is not enabled until there is a transistion from the binary ZERO to the binary ONE state or in other words a positive going transition. This is accordingly received, as explained hereinabove, when the grant flip-flop 22 is reset by means of NOR gate 21.

Flip-flop 37 in addition to the clock input includes a set(S), a D input, and a reset(R) input. The set input is effectively disabled by setting the input thereof to the binary ONE state by means of the MYPLUP+ signal which is no more than a signal received via a pullup resistor to a plus voltage. The D input of flip-flop 37 is coupled to the output of NOR gate 26 by means of inverter 35. Normally the output of NOR gate 26 is a binary ONE and accordingly the output of inverter 35 is a binary ZERO. These conditions are changed when the BSDCNN— signal goes to the binary ZERO state just after time 7-C, i.e., time 7-C plus the delay period associated with elements 24 and 26. Thus shortly after time 7-C the output of NOR gate 26 will change to the binary ZERO state thereby presenting a binary ONE state at the D and reset inputs of flip-flop 37. It is noted that a change in the binary ONE state to the binary ZERO state will reset flip-flop 37 thereby presenting a binary ZERO state at the Q output of flip-flop 37. A binary ONE state at the output of inverter 35 continues for so long as the BSDCNN— signal is a binary ZERO and for 60 nanoseconds thereafter consistent with the delay period of delay 25. Shortly after the grant flip-flop 22 is reset and before the BSDCNN— signal has an affect on the output of NOR gate 26, the clock input of flip-flop 37 is enabled so that a binary ONE state at the D input thereof causes the Q output of flip-flop 37 to change from the binary ZERO to the binary ONE state thereby enabling flip-flop 17. At the time when the strobe signal, i.e., the BSDCND+ signal is no longer present, as can be seen with respect to the BSDCND— signal as shown in the timing diagram of FIG. 2, and more particularly at time 7-G, the output of NOR gate 26 changes back to the binary ONE state thereby causing the output of inverter 35 to change from the binary ONE state to the binary ZERO state thereby resetting flip-flop 37. The binary ZERO state thereafter continues to be present at the Q output of flip-flop 37 until the above operation is again commenced.

The coupling of the output of inverter 35 to the D input as well as the reset input of flip-flop 37 enables better pulse shaping to be provided at the Q output of flip-flop 37. In addition, based upon the fact that a change in binary state from the binary ONE state to the binary ZERO state will reset the flip-flop 37, this insures that the flip-flop 37 will be reset prior to the enabling of the clock input of flip-flop 37.

As discussed hereinbefore, the coupling between the Q output of request flip-flop 17 and NAND gate 19 is dependent upon the position of the unit on the bus 200. More particularly, the element 28 in such coupling between flip-flop 17 and NAND gate 19 is a direct connection for all units which are not the highest priority unit. For the unit which is the highest priority unit and, more particularly, by the illustration of FIG. 1, memory 202, element 28 is a delay element similar to delay 13 and, by way of illustration, may include a delay of 20 nanoseconds. The reason for this is that in the highest priority unit the top nine inputs of its NAND gate 19 are a binary ONE signal. This binary ONE signal may be provided for each such one of the nine lines by means of a pullup resistor coupled thereto, the other end of which is coupled to a plus voltage source similar to the manner in which the MYPLUP+ signal is so coupled. With each of the nine inputs to NAND gate 19 being a binary ONE, and with the BSDCNB— signal being normally a binary ONE, and further assuming that the user ready signal is in the binary ONE state, then without a delay element 28 in the priority logic of the highest priority unit, such highest priority unit would always win access to the bus without incurring the delay provided by delay 13. Thus, by providing a delay in element 28, this prevents the highest priority device from setting its grant flip-flop for the period of, for example, 20 nanoseconds after the time it sets its request flip-flop 17.

Thus, in this manner, the highest priority unit is also prevented from gaining access to the bus 200 during a bus cycle of another unit. This is so because the BSDCNB— signal will be binary ZERO if, in fact, another bus cycle is in process. It can be seen that this inhibiting of the priority logic of the highest priority unit may be accomplished in other ways. For example, as explained in the aforementioned U.S. patent, the output of delay 13 may be coupled to another input of NAND gate 19 in which case, for each priority logic of each unit, this would replace the need for BSDCNB— signal at one input of gate 19 and the need for a delay element 28 in the priority logic of the highest priority unit. However, in logic which requires the extreme speed as indicated herein, loading effects depending upon the component picked may present a problem. Accordingly, by the technique as explained herein, the delay 13 includes two element loads as opposed to three element loads. It can be further seen that such loading problem might be prevented by placing a driver or amplifying element at the output of delay 13, the output of which driver would be coupled to NAND gate 19, NOR gate 14 and AND gate 20, without presenting a loading problem. However, this has the effect of slowing down the operation of the priority logic by a factor determined by a propagation delay through such driver element.

The speed with which a data processing system accomplishes its various operations is very important. This timing becomes even more critical as the information is passed over common paths such as the system bus 200, as shown in FIG. 1. For example, as shown in FIG. 2, certain signals have to be set and reset in a given period of time in order to present the correct state or normal state of the signal on the bus 200 at the proper time thereby avoiding error conditions. Recovery time of a signal is particularly important. As used herein, such recovery time refers to the time required for certain signals on the bus 200 to recover from a low logic state, that is, a binary ZERO state to a predetermined level or high logic state, that is, a binary ONE state. The manner in which such recovery time may be made minimal is to match the value of the characteristic impedance ($Z_0$) of each line of the bus and the values of the termination impedance or resistors. If the characteristic impedance and termination impedance are set equal, then the signal transmitted on the bus will be typically a clean step voltage in which case reflections on the bus will be avoided. The manner in which transmission line characteristic impedance and termination impedance are matched to provide a step signal and avoid reflections etc. is discussed in a book entitled "PULSE, DIGITAL AND SWITCHING WAVEFORMS" by Millman and Taub, McGraw-Hill, 1965.

Figure 4:
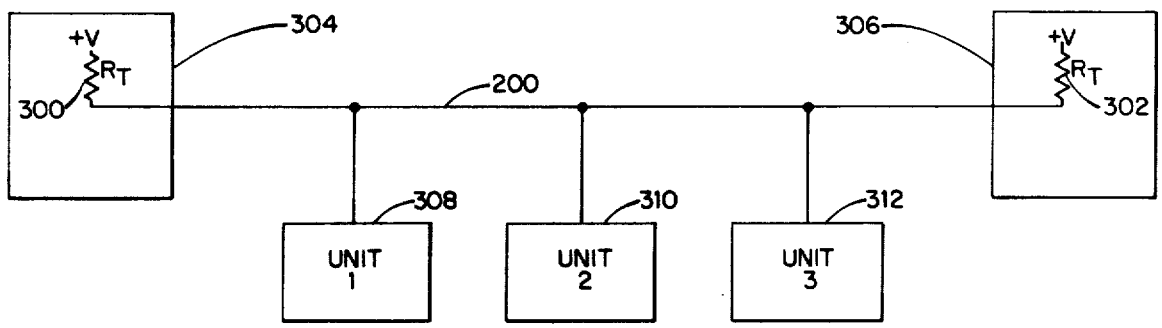
FIG. 4 illustrates the manner in which each signal line on the bus of the present invention is terminated.

The bus 200 of the present invention, includes two ends. Accordingly, as can be seen in FIG. 4, the bus 200, only one line of which is shown, is coupled to two terminating resistors ($R_T$) whose other ends are each coupled to a plus voltage source. The terminating resistors 300 and 302 are included on so-called terminator boards 304 and 306 respectively, which are used to house each of the bus 200's lines respective terminating resistor. Also shown coupled to the bus 200 are various units including units 1, 2 and 3, elements 308, 310 and 312 respectively. When the terminating resistor is set equal to the characteristic impedance, as can be shown in FIG. 5, the signal as shown by the waveform 314, is usually a clean step waveform, and has a magnitude such that the so-called threshold voltage ($V_T$) of the receiver or transistor to be turned on in the respective unit 308, 310 or 312, is exceeded on the first pass of the signal on its particular line of bus 200. The reference to a single pass of a signal on a line of bus 200 means that there have been no reflections of that particular signal and accordingly that the threshold voltage is reached on the first pass, as in the case of waveform 314 of FIG. 5.

Figure 5:
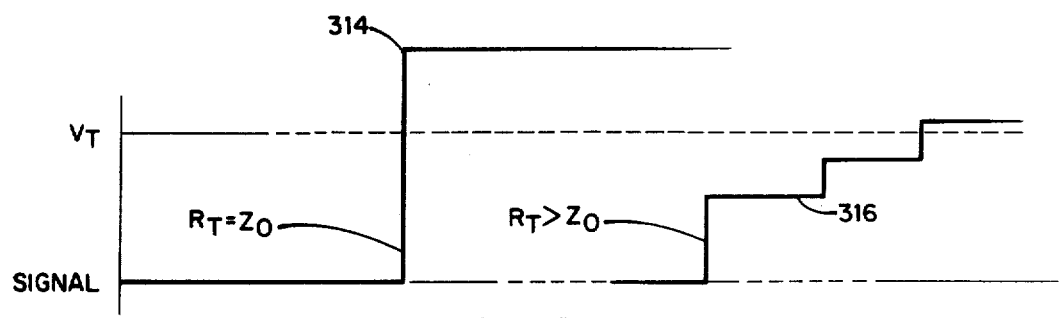
FIG. 5 illustrates various wave shapes of signals which may be transferred on the bus of the present invention.

In so setting the terminating resistors 300 and 302 equal to the characteristic impedance, this increases the power dissipation, i.e., the current drawn in the system. Accordingly, although it is desirable to generate clean waveforms with minimized reflections in the system, the power drain may be excessive and accordingly one or more passes of the signal and accordingly one or more reflections of the signal from its source and back to the terminating resistor may be tolerable if in fact the time for such passes is available. Thus, by setting the terminating resistor to a value greater than the characteristic impedance, less power is consumed, however, at the expense of requiring more than one pass of the signal in the system. This is shown in FIG. 5 by waveform 316 which shows two such reflections prior to its reaching the threshold voltage ($V_T$).

In the bus of the present invention, recovery time is most critical when the so-called bus cycles occur at their maximum rate, that is, when a new bus cycle begins as soon as the old cycle ends. Given a bus signal which is in the low logic state during the old bus cycle, there are two possible logic states, that is the high logic state or the low logic state, in which the signal must be for the new bus cycle. One possible occurrence is that while the signal is recovering from a low state of the old cycle to the high state of the new cycle, a new master unit drives the signal to the low state. This may be accomplished, for example, by the use of open collector output drivers, the driver or transistor being a low impedance when turned on and a high impedance when turned off. The low state at the output of the driver or transistor is provided when the driver is turned on and presents a low impedance. As this point, the recovery from the low state to the high state is aborted. The low logic state propagates on the first pass down the bus due to the low output impedance of the driver or transistor with respect to the impedance of the bus. Therefore, the new low state is transmitted over the bus in the same time as that time associated with bus cycles which are widely spaced in time.

The other possible occurrence is that this signal which we are analyzing and which was in the low state in the old bus cycle, must recover to the high state for the new bus cycle. To analyze this situation, the time in the new bus cycle when the high logic state must be valid should be determined. It is important to note that the new master unit transmits a high state for the given signal line by not turning on its open collector output driver for such line. Therefore, the new master unit does not affect the recovery time of the signal. The new master unit as has been seen does however provide a timing pulse (BSDCNN−) which the new slave uses to determine when the information transmitted by the new master is valid. With this knowledge, it is possible to define and relate the recovery time to the timing pulse BSDCNN− or the strobe pulse BSDCND−.

It will be seen by the present invention that lines such as data, address or control lines are unable to recover even with high termination resistor values thereby delaying the response in the system, unless the invention hereof is practiced. This is accomplished by enabling such data, address or control lines to recover to the high state not only during the old cycle after the slave unit has stored such information, but also during the new cycle before the slave unit must in fact strobe such information therein.

Figure 8:
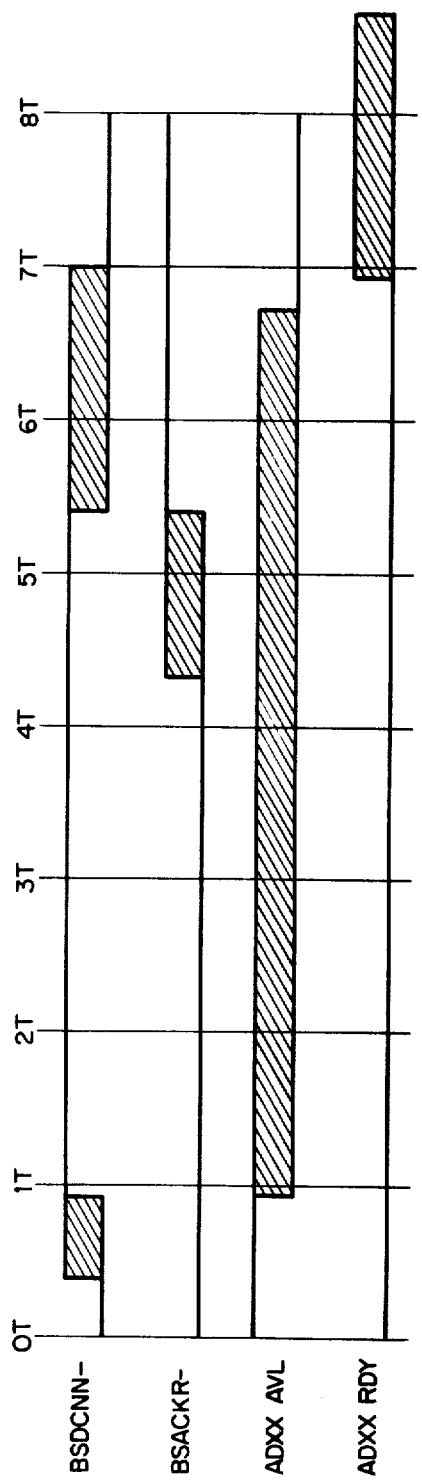
FIG. 8 illustrates a timing diagram of the operation of the signal recovery technique of the present invention.
Figure 7:
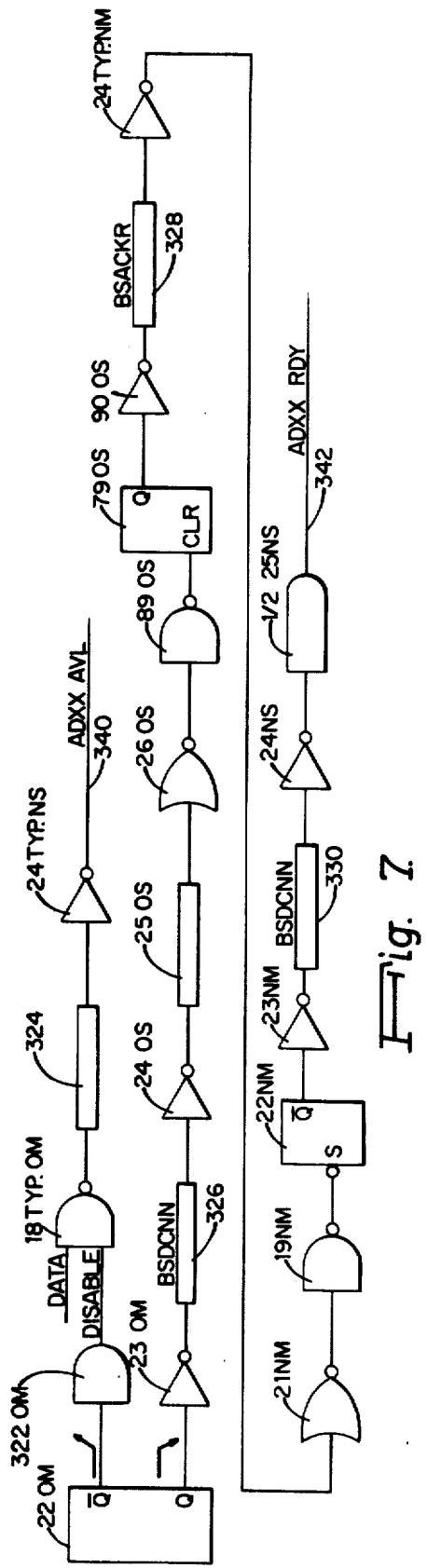
FIG. 7 illustrates the priority logic of FIG. 3 and other system logic associated with the signal recovery technique of the present invention.

The manner in which this is accomplished is shown by the logic diagram of FIG. 7 and by the timing diagram of FIG. 8. To analyze the technique of the present invention, the units which are controlling the bus are defined as follows: old master (OM)—the unit which is sending data in the old bus cycle; old slave (OS)—the unit which is receiving data in the old bus cycle; new master (NM)—the unit which is sending data in the new bus cycle; and new slave (NS)—the unit which is receiving data in the new bus cycle. It is noted that the old master, old slave, new master or new slave may be different units coupled with the bus 200.

Figure 6:
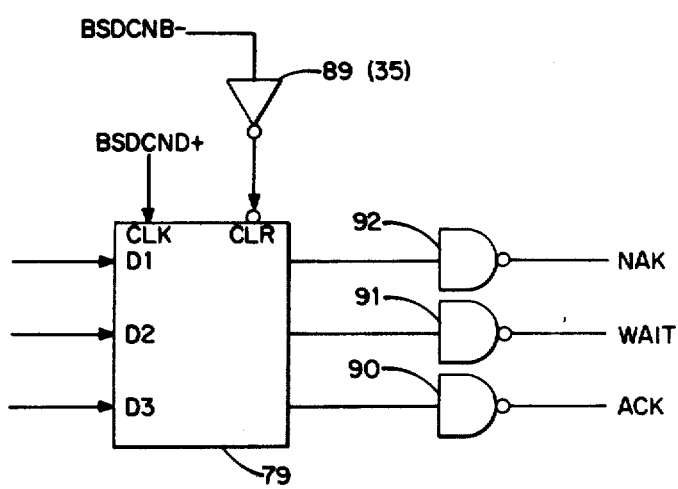
FIG. 6 illustrates the manner in which the slave unit may respond to a master unit.

Now referring to FIG. 7, the pertinent logic elements of FIG. 3 pertaining to the timing of the present invention are shown. FIG. 6 illustrates the manner in which the ACK, NACK and WAIT signals are generated and, more particularly, as shown in the aforementioned U.S. patent. More particularly, however, the element 79 includes three flip-flops including those having inputs D1, D2 and D3 respectively. The outputs thereof are coupled to generate such signals via inverters 90, 91 and 92. The BSDCND+ signal is coupled to clock the flip-flops in element 79 and the BSDCNB− signal is coupled via inverter 89, which is shown as inverter 89 in the aforementioned U.S. patent, to clear the flip-flops in element 79. Inverter 89 may have been replaced by inverter 35 in FIG. 3 whose output would them be directly coupled to the CLR input of element 79.

Now more particularly with respect to FIG. 7, the starting point is the grant flip-flop 22 of the old master, referred to as flip-flop 22OM, in order to mark the logic of FIG. 7 with the same element numbers as shown in FIGS. 3 and 6 and in order to indicate whether it is a logic element in the old master, the old slave, the new master or the new slave. In some cases, the word TYP. is indicated beside the element number designation, which indicates that the element is typical of the numbered element, and further is in the particular unit indicated. For example, the Q output of element 22OM is coupled through buffer 322OM to driver 18TYP.OM which indicates that such driver is typical of driver 18 and also includes enable (disable) input, and is in the old master.

As indicated, the timing starts with the grant flip-flop 22 of the old master. Such timing starts at a time when element 22OM is reset and the $\overline{Q}$ output goes to a binary ONE state and the Q output goes to a binary ZERO state. For the particular line affected, and by way of illustration one of the data lines as shown at one input of driver 18TYP., in the old master the data line must be stable as indicated by the ADXX AVL (Available) signal prior to the time that the new slave receives a strobe signal and is ready to strobe in the data so received as indicated by the ADXX RDY (Ready) signal. The time at which the flip-flop 22OM is reset is at the end of the cycle between time 7-E and 7-F as shown in the timing diagram of FIG. 2. The recovery time of the data signal is basically the time associated with the signal's propagation over the data line as shown by element 324. The bus recovery time is thus represented by element 324 which can be thought of as the conductor coupling the common line used by the various units coupled to the bus 200 which common line is usually referred to as part of a so-called backplane. Other backplane lines are shown as for example by elements 326, 328 and 330.

Thus, prior to the end of a bus cycle at the time the grant flip-flop 22 of the old master is reset, that is, between the time 7-E and 7-F as shown in the timing diagram of FIG. 2, the data line by way of illustration in FIG. 7 must begin to recover and must have completed its recovery to the binary ONE state or high logic state between lines 7-C and 7-D. As mentioned hereinbefore, this is the case because the time to change from the binary ZERO state to the binary ONE state may be appreciable if, in fact, the terminating resistor is a high value. Thus the ADXX AVL on line 340 must have recovered prior to the time that the slave unit is ready to strobe in the data on the next cycle in response to a signal on the ADXX RDY line 342.

Now referring more particularly to the manner in which the ADXX AVL line 340 recovers, i.e., the particular data signal recovers, the resetting of the grant flip-flop 22 of the old master provides at the $\bar{Q}$ output thereof, a positive going waveform which is received by buffer 322. The data signal is received by driver 18TYP. in the old master which, in response to the resetting of such grant flip-flop of the old master, disables the data signal on the bus thereby initiating the bus recovery time for such data signal via element 324. As indicated hereinbefore, the bus recovery time based on the high value of the terminating resistor will cause several reflections on the particular data line thereby resulting in a waveform such as that shown by waveform 316 of FIG. 5. When the threshold voltage ($V_T$) is reached, this will turn on a receiver which is typical of receiver 24, which receiver is located in the new slave. Thus, the particular data line will be stable and the signal thereon will be ready to be strobed into the new slave at a time determined by the delays associated with the elements between the $\bar{Q}$ output of the grant flip-flop 22 of the old master and the ADXX AVL line 340. Thus referring to FIG. 8, as can be seen by the waveform for BSDCNN− signal, between time 0T and 1T, and depending upon the propagation delay in the circuits, either at the middle of such period or closer to time 1T, as represented by the cross-hatched area, the BSDCNN− signal goes from the binary ZERO state to the binary ONE state which time is that time 7-F as shown in FIG. 2. Also as shown in FIG. 8, the ADXX AVL signal will be present on line 340 as indicated by its low state, either right after the BSDCNN− signal goes to the binary ONE state or at a later time by way of illustration between time 6T and 7T. The time between the change in the state of the ADXX AVL signal is contributed to by the components coupled with the $\bar{Q}$ output of the grant flip-flop 22 of the old master as shown in FIG. 7.

By way of illustration, the actual time between time 0T and 1T and 2T etc. may each be for example 24 nanoseconds so that the time between 0T and 8T is 192 nanoseconds. These times were actually calculated for the bus 200 of the present invention and represents a recovery time requiring several reflections depending upon the length of bus 200, but in any case representing a maximum recovery time within element 324 of 120 nanoseconds, some of which time is coexistent with the old cycle and some of which time is coexistent with the new cycle on the bus 200. As indicated hereinbefore, this feature thereby reduces the power consumption without reducing the system response time.

When the grant flip-flop 22 of the old master is reset, the Q output thereof goes from the binary ONE state to the binary ZERO state which transition is received by driver 23 of the old master, and thereafter placed as the BSDCNN− signal on the bus or the backplane portion 326 thereof and is received by receiver 24 of the old slave. Thus, as shown in the diagram of FIG. 3, the output of the driver 24 of the old slave for the purpose of discussing the timing of the present invention, is received by delay 25 of the old slave which is by way of example 60 nanoseconds in duration. It is remembered that the strobe signal BSDCND+ signal is generated at the end of the 60 nanoseconds period. The first 30 seconds of such delay period is utilized in the system to deskew the incoming information from the bus 200. That is to say, all of the control signals, address signals and data signals may not be received at the same time and may, as a practical matter, be received as much as 30 nanoseconds apart in some cases. At the end of this time, a tap on the delay 25 is included to generate the actual strobe signal after which such signals as received on the bus, including the control signals, address signals and data signals, are decoded. In the alternative, the information may not be strobed in until the end of the full 60 nanoseconds. For the purposes of the timing of the present invention however, it is assumed that the data, address and control information is strobed at the earliest possible time, that is 30 seconds after the BSDCNN signal is received by delay element 25 in order to accommodate any such deskewing of such signals.

The signal from delay 25, for purposes of the timing of the present invention is received by NOR gate 26 of the old slave which in turn is coupled to clear the flip-flops in element 79 via driver 89 as shown in FIG. 6 thereby causing the BSACKR signal (ACK) via driver 90 of the old slave to turn off at time 7-H as shown in FIG. 2 which is also represented between times 4T and 6T of FIG. 8. It is noted that the ACK signal was chosen for purposes of illustration and that the other signals NACK and WAIT respond in the same manner. As indicated hereinbefore, the turning off of the ACK signal causes the grant flip-flop which had been set to be reset which in turn resets the request flip-flop of the unit whose grant flip-flop has been set. Thus the turn off of the ACK signal is received by a receiver typical of receiver 24 which receiver is in the new master. This turn-off of the ACK signal is also received by all other units. In turn then, the NOR gate 21 of the new master receives such indication that the ACK signal has been turned off which indication in turn is received by NAND gate 19 of the new master, thereby enabling the setting of grant flip-flop 22 of the new master, all other conditions being met. Thus, as can be seen, a new cycle has begun before the signal has recovered from its state, if different, during the old cycle. More particularly, the old cycle may be said to have begun when the ACK signal went to the binary ONE state as indicated in the timing diagram of FIG. 8 and as provided at the output of driver 90 of the old slave.

When grant flip-flop 22 of the new master has been set, its Q output provides a binary ONE state to the input of driver 23 of the new master which is coupled over the backplane 330 to present the BSDCNN− signal to the driver 24 of the new slave. Within the 30 nanosecond period as provided by one-half of the delay associated with element 25 of the new slave, the ADXX RDY signal is provided on line 342 as shown in the timing relationship of FIG. 8. Thus, it can be seen from FIG. 8 that the signal on line 340, that is the data in this case, is available before the strobing action as provided in response to the signal on line 342.

It can be seen that from the point the grant flip-flop of the old master has been reset, the data line or address or control line, as may be the case, has recovered in a time, the duration of which is determined by the time it takes for the BSDCNN— signal to be received on the bus and clear the flip-flops in element 79. Further, the particular signal being recovered recovers not only during the old cycle up to the point where the ACK etc. signal is inactivated, but also during the new cycle from the point just before the point in time when the NAND gate 19 of the new master is enabled to set its grant flip-flop 22 through the time when deskewing of the data, address and control signals has been provided for or in other words one-half of the delay period associated with delay 25. In this manner, therefore, the bus of the present invention requires less power to operate and in so doing nevertheless operates at the required system speed.

While the invention has been particularly shown and described with reference to preferred embodiments thereof, it will be understood by those skilled in the art that the foregoing and other changes in form and details may be made therein without departing from the spirit and scope of the invention.

Having described the invention, what is claimed as new and novel and for which it is desired to secure Letters Patent is:

1. In a data processing system having a common bus for coupling a plurality of units for the transfer of information therebetween, each transfer taking place during a bus cycle granted to the highest priority unit requesting a bus cycle, the unit transferring said information referred to as a master unit in a particular cycle and the unit receiving said information referred to as a slave unit for a particular cycle, a method for recovering a signal to a predetermined value, said signal representing a portion of said information, said method comprising the steps of:
   A. indicating by means of a first signal to each of said units that a previous master unit has transferred information, including said signal to be recovered, over said bus during a previous bus cycle;
   B. enabling said signal to be recovered to recover to said predetermined value, in response to said step of indicating, in a period of time determined by the length of said bus, the characteristic impedance of a signal line of said bus on which said signal to be recovered is transferred, and the value of a termination impedance coupled with said signal line, said value of said termination impedance being greater than said characteristic impedance; and
   C. completing the following method steps in response to said step of indicating and concurrently with said step of enabling, provided however that said signal is recovered in response to said step of enabling prior to the completion of said following steps:
      (1) deactivating an acknowledgement signal provided by a previous slave unit to said previous master unit in response to the transfer of information from said previous master unit,
      (2) coupling in response to said step of deactivating a new master unit to transfer information over said bus, and
      (3) transferring in response to said step of coupling a strobe signal to a new slave unit for use in receiving information at said new slave unit.

2. A method as in claim 1 wherein the value of said termination impedance is at least twice the value of said characteristic impedance.

3. A method as in claim 1 wherein the value of said termination impedance is at least four times the value of said characteristic impedance.

4. A method as in claim 1 wherein the time to recover said signal to said predetermined value is increased as the value of said termination impedance is increased in relationship to the value of said characteristic impedance.

5. A method as in claim 4 wherein said system consumes power during each said transfer of information and wherein the power consumed in said system is reduced as the value of said termination impedance is increased in relationship to the value of said characteristic impedance.

6. A method as in claim 1 further comprising the steps of:
   A. generating in a previous slave unit, in response to the receipt of said information from said previous master unit, said acknowledgement signal; and
   B. in response to the receipt of said information from said previous master unit enabling said step of indicating in response to said acknowledgement signal.

7. A method as in claim 6 further comprising the steps of:
   A. providing a second signal on said bus which said second signal indicates that a said master unit is using said bus for the transfer of information; and
   B. deactivating said second signal in response to said acknowledgement signal.

8. In a data processing system having a common bus for coupling a plurality of units for the transfer of information therebetween, each transfer taking place during a bus cycle granted to the highest priority unit requesting a bus cycle, the unit transferring said information referred to as a master unit in a particular cycle and the unit receiving said information referred to as a slave unit for a particular cycle, apparatus for recovering a signal to a predetermined value, said signal representing a portion of said information, said apparatus comprising:
   A. means for indicating by means of a first signal to each of said units that a previous master unit has transferred information, including said signal to be recovered, over said bus during a previous bus cycle;
   B. first means for enabling said signal to be recovered to recover to said predetermined value, in response to said means for indicating, in a period of time determined by the length of said bus, the characteristic impedance of a signal line of said bus on which said signal to be recovered is transferred, and the value of a termination impedance coupled with said signal line, said value of said termination impedance being greater than said characteristic impedance;
   C. second means for enabling, responsive to said means for indicating and operative concurrently with the operation of said first means for enabling, for enabling the generation of a control signal;

D. means, responsive to said control signal, for deactivating an acknowledgement signal provided by a previous slave unit to said previous master unit in response to the transfer of information from said previous master unit;

E. means for coupling, in response to said means for deactivating, a new master unit to transfer information over said bus; and F. means for transferring, in response to said means for coupling, a strobe signal to a new slave unit for use in receiving information at said new slave unit.

9. Apparatus as in claim 8 wherein the time to recover said signal to said predetermined value is increased as the value of said termination impedance is increased in relationship to the value of said characteristic impedance.

10. Apparatus as in claim 9 wherein said system consumes power during each said transfer of information and wherein the power consumed in said system is reduced as the value of said termination impedance is increased in relationship to the value of said characteristic impedance.

11. Apparatus as in claim 8 further comprising:

A. means for generating in a previous slave unit said acknowledgement signal, in response to the receipt of said information from said previous master unit; and B. means for enabling said means for indicating in response to said acknowledgement signal.

12. Apparatus as in claim 11 further comprising:

A. means for providing a second signal on said bus which said second signal indicates that a said master unit is using said bus for the transfer of information; and B. means for deactivating said second signal in response to said acknowledgement signal.

* * * * *